GEORGE F. MORSE.
Improvement in Ornamenting and Dressing Glass and Metal Surfaces, &c.
No. 121,119.
Patented Nov. 21, 1871.
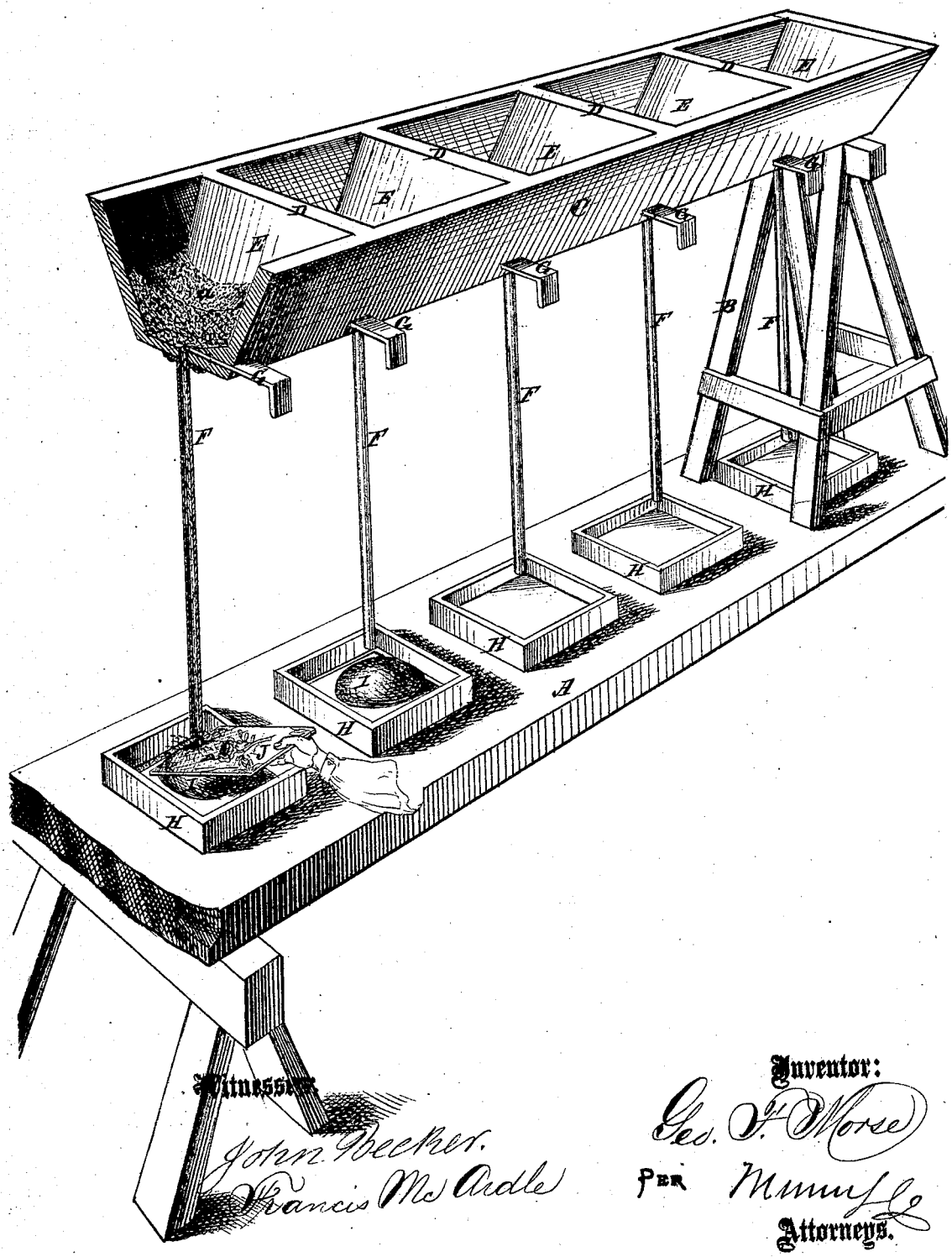

UNITED STATES PATENT OFFICE.

GEORGE F. MORSE, OF NEW YORK, N. Y.

IMPROVEMENT IN ORNAMENTING AND DRESSING GLASS AND METAL SURFACES, &C.

Specification forming part of Letters Patent No. 121,119, dated November 21, 1871.

*To all whom it may concern:*

Be it known that I, GEORGE F. MORSE, of the city, county, and State of New York, have invented a new and useful Improvement in the Ornamentation and Dressing of the Surfaces of Glass and other substances; and I do hereby declare that the following is a full, clear, and exact description thereof, which will enable others skilled in the art to make and use the same, reference being had to the accompanying drawing forming part of this specification.

The invention consists in the machine and in the compound hereinafter fully described and subsequently pointed out in the claims.

In carrying out these improvements the surfaces of the glass or other substances to be ornamented or dressed, which surfaces may be of plain, curved, or other form, are subjected to the action of a falling or gravitating mass of corundum and emery, which compound constitutes the dressing material, substantially in the manner hereinafter described.

The mechanism which I employ consists substantially of one or more hoppers or receptacles for receiving the dressing material, and one or more tubes connecting with the receptacles for conveniently directing the said material during its gravitation upon the glass or other substance to be dressed.

The drawing is a perspective view of an apparatus intended for the practical working of my improvements.

A is a work-bench upon which, resting on supports B, I arrange a longitudinal box, C, which I divide, by means of partitions D, into a series of hoppers, E, into each of which I place a mass of the dressing material *a*. Pendant from the center of each of the hoppers E is a small tube about eight feet in length, through which the dressing material descends by gravitation, and is discharged through the lower end of the tube. The upper extremity of each tube is provided with a slide-valve, G, by which the quantity of dressing material which falls through the tube may be regulated or wholly shut off. Shallow trays H receive the dressing material as fast as it discharges from the tube F. I are cushions on which the workman rests the glass-plates J, or other substances to be dressed. The practical operation of my improvement is as follows: I provide a mass of dressing material composed of two parts of corundum in powder, having a fineness known in the American market as No. 3, and one part of emery in powder, known and styled in the American market as best English emery No. 24. I prefer to use the proportions and quantities of the substances here mentioned; but I do not limit or confine myself to these proportions or qualities, as they may be varied at the pleasure of the operator. These substances, having been intimately mixed, are placed in the several hoppers E. The glass-plates J, or other substances to be ornamented or dressed, are then held beneath the lower extremities of the tubes F, and the slide-valves G are opened so as to allow the dressing material to descend by gravitation and fall upon the surface of the glass or other substance. The effect of this dressing material is to cut the surface of the glass or other substance, giving it a grained appearance of beautiful hues, even texture, very ornamental, and desirable. In order to produce designs of any desired pattern upon the glass or other substance, I place upon the surface thereof a pattern, cut out, either in paper, cloth, textile material, metal, paper gelatine, parchment, rubber, gutta-percha, or collodion film, or any other film or suitable substance having such a nature that it will throw off or resist the action of the dressing material, and when the aforesaid patterns are applied to the glass or other substance, and subjected to the action of the dressing material in the manner described, the glass or substance will be dressed or cut only in the open parts or interstices of the pattern, while the parts of the glass or substance that are protected by the pattern will not be cut or acted upon by the dressing material, and thus some portions of the glass or substance will be cut or dressed, and the other portions left in their original condition, and the contrasts thus produced will form an ornamental configuration or dressing upon the surface of the glass or other substance. By continuing the action of the dressing material upon the surface of the glass or other substance for a sufficient length of time, in connection with patterns of suitable nature, as described, I form raised patterns having almost any desired degree of relief. In the same manner I also produce intaglio patterns or depressions to almost any desired degree in the surface of the glass or other substance. The dressing material as fast as it is discharged from the hoppers, is to be replaced in them again, either by attendants or by suitable mechanism.

I do not limit or confine myself to the particular form of the parts in the mechanism herein shown and described, as the forms thereof may be varied in many ways, without departing from my invention. Nor do I limit or confine myself to the dressing or ornamentation of glass, as many other substances may be ornamented or dressed in substantially the same manner, as, for example, the various metals may be dressed and ornamented, and the most intricate and beautiful chasings and ornamental designs may be inwrought upon them, having in many cases the appearance of costly engravings. Various kinds of stone may also be ornamented and dressed. Letters, writings, figures, and ornamental designs of all kinds may be produced thereon, either in relief or in intaglio.

I am aware of the patent granted to B. C. Tilgman, October 18, 1870, for cutting or dressing with sand projected against the object which is to be dressed or ornamented, and desire to disclaim all that is therein shown and described, but—

What I do esteem to be my invention, and desire to protect by Letters Patent, is—

1. One or more hoppers E and tubes F, combined, as described, with a suitable receptacle thereunder for the article to be dressed or ornamented, as and for the purpose set forth.

2. A compound formed of coarse particles of corundum and emery intimately mixed and applied, as and for the purpose set forth.

GEORGE F. MORSE.

Witnesses:
 T. B. MOSHER,
 GEO. W. MABEE. (54)